US012595331B2

(12) United States Patent
Ngo et al.

(10) Patent No.: US 12,595,331 B2
(45) Date of Patent: Apr. 7, 2026

(54) SYNTHESIS OF BLOCK POLYMERS BASED ON 1,3-DIENE AND ETHYLENE

(71) Applicants: COMPAGNIE GENERALE DES ETABLISSEMENTS MICHELIN, Clermont-Ferrand (FR); CENTRE NATIONAL DE LA RECHERCHE SCIENTIFIQUE, Paris Cedex (FR); ECOLE SUPERIEURE DE CHIMIE PHYSIQUE ELECTRONIQUE DE LYON, Villeurbanne Cedex (FR); UNIVERSITÉ CLAUDE BERNARD LYON 1, Villeurbanne Cedex (FR)

(72) Inventors: Robert Ngo, Clermont-Ferrand Cedex (FR); Nicolas Baulu, Clermont-Ferrand Cedex (FR); Christophe Boisson, Tramoyes (FR); Franck D'Agosto, Genas (FR); François Jean-Baptiste-Dit-Dominique, Clermont-Ferrand Cedex (FR); Julien Thuilliez, Clermont-Ferrand Cedex (FR)

(73) Assignees: COMPAGNIE GENERALE DES ETABLISSEMENTS MICHELIN, Clermont-Ferrand (FR); CENTRE NATIONAL DE LA RÈCHERCHE SCIENTIFIQUE, Paris Cedex (FR); ECOLE SUPÈRIEURE DE CHIMIE PHYSIQUE ELECTRONIQUE DE LYON, Villeurbanne Cedex (FR); UNIVERSITÈ CLAUDE BERNARD LYON 1, Villeurbanne Cedex (FR)

( * ) Notice: Subject to any disclaimer, the term of this patent is extended or adjusted under 35 U.S.C. 154(b) by 501 days.

(21) Appl. No.: 18/038,758

(22) PCT Filed: Nov. 22, 2021

(86) PCT No.: PCT/FR2021/052059
§ 371 (c)(1),
(2) Date: May 25, 2023

(87) PCT Pub. No.: WO2022/112700
PCT Pub. Date: Jun. 2, 2022

(65) Prior Publication Data

US 2024/0026058 A1 Jan. 25, 2024

(30) Foreign Application Priority Data

Nov. 26, 2020 (FR) ...................................... 2012207

(51) Int. Cl.
*C08F 297/08* (2006.01)
*C08F 4/50* (2006.01)

(52) U.S. Cl.
CPC ............ *C08F 297/083* (2013.01); *C08F 4/50* (2013.01)

(58) Field of Classification Search
CPC ........ C08F 210/02; C08F 4/50; C08F 236/06; C08F 4/52; C08F 2/001; C08F 2500/34
See application file for complete search history.

(56) References Cited

U.S. PATENT DOCUMENTS

| | | | | |
|---|---|---|---|---|
| 2013/0184402 | A1* | 7/2013 | Horikawa | C08F 236/06 525/314 |
| 2014/0179861 | A1* | 6/2014 | Horikawa | C08K 3/013 525/313 |
| 2022/0332878 | A1* | 10/2022 | Moreso | C08F 297/083 |
| 2024/0043600 | A1* | 2/2024 | Baulu | C08F 210/02 |

FOREIGN PATENT DOCUMENTS

| | | | | |
|---|---|---|---|---|
| EP | 2599809 | A1 * | 6/2013 | C08F 236/06 |
| JP | H09255742 | A | 9/1997 | |
| WO | 2007054223 | A2 | 5/2007 | |

(Continued)

OTHER PUBLICATIONS

Jerry March, "Advanced Organic Chemistry," 4th Edition, 1992, pp. 622-623.

(Continued)

*Primary Examiner* — Mark S Kaucher
(74) *Attorney, Agent, or Firm* — Dickinson Wright PLLC

(57) ABSTRACT

A process for preparing a multiblock polymer by statistical copolymerization of a mixture containing ethylene and a 1,3-diene and subsequent polymerization of ethylene in the presence of a rare-earth metallocene and an organomagnesium reagent $R^B$—(Mg—$R^A$)$_m$—Mg—$R^B$ or X—Mg—$R^A$—Mg—X is provided. According to the formula, $R^A$ is a divalent aliphatic hydrocarbon-based chain optionally interrupted with one or more oxygen or sulfur atoms or arylene groups, $R^B$ comprises a benzene nucleus substituted with the Mg atom, one of the carbon atoms of the benzene nucleus ortho to the Mg is substituted with a methyl, an ethyl or an isopropyl or forms a ring with the carbon atom which is its closest neighbour and which is meta to the Mg. The other carbon atom of the benzene nucleus ortho to the Mg is substituted with a methyl, ethyl or isopropyl, X being a halogen atom, m being greater than or equal to 1.

20 Claims, No Drawings

(56) References Cited

FOREIGN PATENT DOCUMENTS

| | | | |
|---|---|---|---|
| WO | 2007054224 | A2 | 5/2007 |
| WO | 2017093654 | A1 | 6/2017 |
| WO | 2018020122 | A1 | 2/2018 |
| WO | 2019077232 | A1 | 4/2019 |

OTHER PUBLICATIONS

Gary S. Silverman, Philip E. Rakita, "Handbook of Grignard Reagents," 1996, pp. 502-503.
International Search Report (ISR) for International Application No. PCT/FR2021/052059 Mailed Feb. 24, 2022, 4 pages.

* cited by examiner

SYNTHESIS OF BLOCK POLYMERS BASED ON 1,3-DIENE AND ETHYLENE

This U.S. patent application is a national phase entry of international patent application no. PCT/FR2021/052059, filed Nov. 22, 2021, which claims priority to French patent application no. FR2012207, filed Nov. 26, 2020, the entire contents of which are incorporated herein by reference in their entirety.

BACKGROUND

1. Technical Field

The field of the present invention is that of processes for the synthesis of "multiblock" block polymers based on 1,3-diene and ethylene which contain at least three blocks. More particularly, the field of the invention is that of block polymers which include at least a first copolymer block based on ethylene and a 1,3-diene and two other polyethylene blocks, each polyethylene block being attached to a different end of the first block which happens to be a central block within the block polymer.

2. Related Art

EP 2599809 A1 describes the synthesis of multiblock polymers based on ethylene and 1,3-butadiene. They are synthesized by a first step of polymerization of ethylene, followed by a step of polymerization of 1,3-butadiene. Multiblock polymers are also synthesized by repeating the sequence of polymerization of a first monomer feed of ethylene and polymerization of a second monomer feed of 1,3-butadiene several times. The block polymers are described as consisting of high cis polybutadiene blocks and polyethylene blocks characterized by a glass transition temperature of high cis polybutadiene and a melting point of polyethylene, respectively. They are synthesized in the presence of a catalytic system which includes three components, namely a rare-earth metallocene, a borate and an alkylaluminium hydride. On account of the process used, the formation of each additional block after the synthesis of a first block requires the addition of a new monomer feed to the polymerization medium. Thus, the synthesis of a triblock polymer requires the use of three monomer feeds, the synthesis of a pentablock requires five monomer feeds, etc. However, a person skilled in the art knows that the addition of a monomer feed to a polymerization medium during the polymerization reaction is generally accompanied by deactivation of some of the active sites which participate in the polymerization reaction, which has the effect of forming polymer species other than the targeted block polymer. This reduces the yield of the target block polymer.

SUMMARY

The Applicants have discovered a much more efficient process for the synthesis of multiblock polymers based on ethylene and 1,3-diene, since it makes it possible to reduce the number of monomer feeds and thus to increase the yield of the desired multiblock polymer.

Thus, a first subject of the invention is a process for preparing a multiblock polymer, which comprises the statistical copolymerization of a monomer mixture containing ethylene and a 1,3-diene, followed by the subsequent polymerization of ethylene in the presence of a catalytic system based on at least one metallocene of formula (Ia) or (Ib) and an organomagnesium reagent of formula (IIa) or (IIb)

$$\{P(Cp^1)(Cp^2)Y\} \quad (Ia)$$

$$Cp^3Cp^4Y \quad (Ib)$$

Y denoting a group including a rare-earth metal atom, $Cp^1$ and $Cp^2$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, $Cp^3$ and $Cp^4$, which are identical or different, are chosen from the group consisting of fluorenyl groups, cyclopentadienyl groups and indenyl groups, the groups being substituted or unsubstituted, $$R^B—(Mg—R^A)_m—Mg—R^B \quad (IIa)$$

$$X—Mg—R^A—Mg—X \quad (IIb)$$

$R^A$ being a divalent aliphatic hydrocarbon-based chain, interrupted or not with one or more oxygen or sulfur atoms or with one or more arylene groups, $R^B$ comprising a benzene nucleus substituted with the magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, X being a halogen atom, m being a number greater than or equal to 1 and preferably equal to 1.

A second subject of the invention is a multiblock polymer, notably a triblock polymer, which may be obtained via the process in accordance with the invention. Its essential characteristic is that it contains a divalent group within the polymer chain as a result of the process used for its manufacture. It has the advantage of being less polluted with polymer species resulting from the partial deactivation of the active sites of polymerization.

DETAILED DESCRIPTION OF EXAMPLE EMBODIMENTS

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b).

The term "based on" used to define the constituents of a catalytic system or of a composition means the mixture of these constituents, or the product of the reaction of a portion or all of these constituents with each other.

Unless otherwise indicated, the contents of the units resulting from the insertion of a monomer into a polymer are expressed as a molar percentage relative to the total monomer units that constitute the polymer.

The compounds mentioned in the description may be of fossil origin or may be biobased. In the latter case, they may be partially or totally derived from biomass or may be obtained from renewable starting materials derived from biomass. Similarly, the compounds mentioned may also be derived from the recycling of already-used materials, i.e. they may be partly or totally derived from a recycling process, or obtained from raw materials which are themselves derived from a recycling process.

In a known manner, an ethylene unit is a unit which has the $—(CH_2—CH_2)—$ unit. It is also known that a 1,3-diene may be inserted into a growing polymer chain by a 1,4 or 2,1 insertion or 3,4 insertion in the case of substituted diene such as isoprene to give rise to 1,3-diene units of 1,4 configuration, 1,3-diene units of 1,2 configuration or 3,4 configuration, respectively.

The process in accordance with the invention comprises the statistical copolymerization of a monomer mixture containing ethylene and a 1,3-diene, followed by the subsequent polymerization of ethylene.

In the present patent application, the term "metallocene" means an organometallic complex, the metal of which, in the case in point the rare-earth metal atom, is bonded to two groups $Cp^3$ and $Cp^4$ or to a ligand molecule consisting of two groups $Cp^1$ and $Cp^2$ connected together by a bridge P. These groups $Cp^1$, $Cp^2$, $Cp^3$ and $Cp^4$, which may be identical or different, are chosen from the group consisting of fluorenyl groups, cyclopentadienyl groups and indenyl groups, these groups possibly being substituted or unsubstituted. It is recalled that rare-earth elements are metals and denote the elements scandium, yttrium and the lanthanides, the atomic number of which ranges from 57 to 71.

According to a first variant of the invention, the metallocene used as base constituent in the catalytic system corresponds to formula (Ia)

$$\{P(Cp^1)(Cp^2)Y\} \quad \text{(Ia)}$$

in which

Y denotes a group including a rare-earth metal atom, $Cp^1$ and $Cp^2$, which are identical or different, are chosen from the group consisting of fluorenyl groups, cyclopentadienyl groups and indenyl groups, the groups being substituted or unsubstituted, P is a group bridging the two groups $Cp^1$ and $Cp^2$ and comprising a silicon or carbon atom.

According to a second variant of the invention, the metallocene used as base constituent in the catalytic system in accordance with the invention corresponds to formula (Ib)

$$Cp^3Cp^4Y \quad \text{(Ib)}$$

in which

Y denotes a group including a rare-earth metal atom, $Cp^3$ and $Cp^4$, which are identical or different, are chosen from the group consisting of fluorenyl groups, cyclopentadienyl groups and indenyl groups, the groups being substituted or unsubstituted.

As substituted cyclopentadienyl, fluorenyl and indenyl groups, mention may be made of those substituted with alkyl radicals containing from 1 to 6 carbon atoms or with aryl radicals containing from 6 to 12 carbon atoms or else with trialkylsilyl radicals, such as $SiMe_3$. The choice of the radicals is also guided by the accessibility to the corresponding molecules, which are the substituted cyclopentadienes, fluorenes and indenes, since said molecules are commercially available or can be readily synthesized.

As substituted fluorenyl groups, mention may be made of those substituted in position 2, 7, 3 or 6, particularly 2,7-di(tert-butyl)fluorenyl and 3,6-di(tert-butyl)fluorenyl. The 2, 3, 6 and 7 positions respectively denote the position of the carbon atoms of the rings as represented in the diagram below, the 9 position corresponding to the carbon atom to which the bridge P is attached.

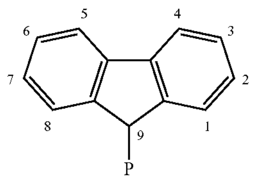

As substituted cyclopentadienyl groups, mention may be made of those substituted in the 2 (or 5) position and also in the 3 (or 4) position, particularly those substituted in the 2 position, more particularly the tetramethylcyclopentadienyl group. Position 2 (or 5) denotes the position of the carbon atom which is adjacent to the carbon atom to which the bridge P is attached, as is represented in the diagram below.

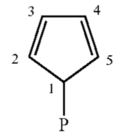

As substituted indenyl groups, mention may be made particularly of those substituted in the 2 position, more particularly 2-methylindenyl or 2-phenylindenyl. Position 2 denotes the position of the carbon atom which is adjacent to the carbon atom to which the bridge P is attached, as is represented in the diagram below.

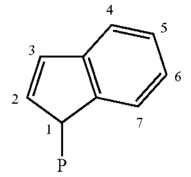

Preferably, the metallocene is of formula (Ia).

Preferably, $Cp^1$ and $Cp^2$ are identical and are chosen from the group consisting of substituted fluorenyl groups and the unsubstituted fluorenyl group of formula $C_{13}H_8$. The catalytic system according to this preferential embodiment has the particular feature of leading to copolymers based on butadiene and ethylene which comprise, in addition to the ethylene monomer units and the butadiene units, cyclic units with a 1,2-cyclohexanediyl unit having the following formula:

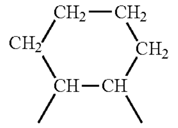

Advantageously, $Cp^1$ and $Cp^2$ are identical and each represent an unsubstituted fluorenyl group of formula $C_{13}H_8$, represented by the symbol Flu.

Preferably, the symbol Y represents the group Met-G, with Met denoting the rare-earth metal atom and G denoting a group comprising the borohydride $BH_4$ unit or denoting a halogen atom chosen from the group consisting of chlorine, fluorine, bromine and iodine. Advantageously, G denotes a chlorine atom or the group of formula (III):

$$(BH_4)_{(1+y)}\text{-}L_y\text{-}N_x \quad \text{(III)}$$

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

Very advantageously, G denotes the group of formula (III).

Any ether which has the ability to complex the alkali metal, notably diethyl ether and tetrahydrofuran, is suitable as ether.

The metal of the metallocene, the rare-earth metal, is preferably a lanthanide, the atomic number of which ranges from 57 to 71, more preferentially neodymium, Nd.

The bridge P connecting the groups $Cp^1$ and $Cp^2$ preferably corresponds to the formula $ZR^1R^2$, in which Z represents a silicon or carbon atom and $R^1$ and $R^2$, which are identical or different, each represent an alkyl group comprising from 1 to 20 carbon atoms, preferably a methyl. In the formula $ZR^1R^2$, Z advantageously represents a silicon atom, Si.

The metallocene that is useful for the synthesis of the catalytic system may be in the form of a crystalline or non-crystalline powder, or else in the form of single crystals. The metallocene may be in a monomer or dimer form, these forms depending on the method of preparation of the metallocene, as is described, for example, in patent application WO 2007/054224 or WO 2007/054223. The metallocene may be prepared conventionally by a process analogous to that described in patent application WO 2007/054224 or WO 2007/054223, notably by reaction, under inert and anhydrous conditions, of the salt of an alkali metal of the ligand with a rare-earth metal borohydride in a suitable solvent, such as an ether, for instance diethyl ether or tetrahydrofuran, or any other solvent known to those skilled in the art. After reaction, the metallocene is separated from the reaction by-products via techniques known to those skilled in the art, such as filtration or precipitation from a second solvent. The metallocene is finally dried and isolated in solid form.

According to a particularly preferential embodiment, the metallocene is of formula (III-1), (III-2), (III-3), (III-4) or (III-5):

$$[Me_2Si(Flu)_2Nd(\mu\text{-}BH_4)_2Li(THF)] \quad \text{(III-1)}$$

$$[\{Me_2SiFlu_2Nd(\mu\text{-}BH_4)_2Li(THF)\}_2] \quad \text{(III-2)}$$

$$[Me_2SiFlu_2Nd(\mu\text{-}BH_4)(THF)] \quad \text{(III-3)}$$

$$[\{Me_2SiFlu_2Nd(\mu\text{-}BH_4)(THF)\}_2] \quad \text{(III-4)}$$

$$[Me_2SiFlu_2Nd(\mu\text{-}BH_4)] \quad \text{(III-5)}$$

in which Flu represents the $C_{13}H_8$ group.

Another basic component of the catalytic system is the co-catalyst, an organomagnesium reagent of formula (IIa) or formula (IIb).

$$R^B\text{—}(Mg\text{—}R^A)_m\text{—}Mg\text{—}R^B \quad \text{(Ia)}$$

$$X\text{—}Mg\text{—}R^A\text{—}Mg\text{—}X \quad \text{(IIb)}$$

$R^A$ being a divalent aliphatic hydrocarbon-based chain, interrupted or not with one or more oxygen or sulfur atoms or with one or more arylene groups, $R^B$ comprising a benzene nucleus substituted with the magnesium atom, one of the carbon atoms of the benzene nucleus ortho to the magnesium being substituted with a methyl, an ethyl or an isopropyl or forming a ring with the carbon atom which is its closest neighbour and which is meta to the magnesium, the other carbon atom of the benzene nucleus ortho to the magnesium being substituted with a methyl, an ethyl or an isopropyl, X being a halogen atom, m being a number greater than or equal to 1 and preferably equal to 1.

The co-catalysts of formula (IIa) and (IIb) both have the particular feature of including two magnesium-carbon bonds involving different magnesium atoms. In formula (IIa), two magnesium atoms each share a first bond with a first carbon atom belonging to $R^B$ and a second bond with a second carbon atom belonging to $R^A$. The first carbon atom is a constituent of the benzene nucleus of $R^B$. The second carbon atom is a constituent of the aliphatic hydrocarbon-based chain $R^A$ which may contain within its chain one or more heteroatoms chosen from oxygen and sulfur or one or more arylene groups. In the preferential case where m is equal to 1, each magnesium atom thus shares a first bond with a first carbon atom of $R^B$ and a second bond with a second carbon atom of $R^A$. In formula (IIb), each magnesium atom thus shares a first bond with a halogen atom and a second bond with a carbon atom of $R^A$.

In formula (IIa), $R^B$ has the characteristic feature of comprising a benzene nucleus substituted with the magnesium atom. The two carbon atoms of the benzene nucleus of $R^B$ ortho to the magnesium bear an identical or different substituent. Alternatively, one of the two carbon atoms of the benzene nucleus of $R^B$ ortho to the magnesium may bear a substituent, and the other carbon atom of the benzene nucleus of $R^B$ ortho to the magnesium may form a ring. The substituent is a methyl, an ethyl or an isopropyl. In the case where one of the two carbon atoms of the benzene nucleus of $R^B$ ortho to the magnesium is substituted with an isopropyl, the second carbon atom of the benzene nucleus of $R^B$ ortho to the magnesium is preferably not substituted with an isopropyl. Preferably, the carbon atoms of the benzene nucleus of $R^B$ ortho to the magnesium are substituted with a methyl or an ethyl. More preferentially, the carbon atoms of the benzene nucleus of $R^B$ ortho to the magnesium are substituted with a methyl.

The organomagnesium compound of formula (IIa) preferentially corresponds to formula (IIa-m) in which $R_1$ and $R_5$, which are identical or different, represent a methyl or an ethyl, preferably a methyl, $R_2$, $R_3$ and $R_4$, which are identical or different, represent a hydrogen atom or an alkyl and $R^A$ is a divalent aliphatic hydrocarbon-based chain, interrupted or not with one or more oxygen or sulfur atoms or with one or more arylene groups, and m is greater than or equal to 1. Preferably, $R_1$ and $R_5$ represent a methyl. Preferably, $R_2$ and $R_4$ represent a hydrogen atom.

(IIa-m)

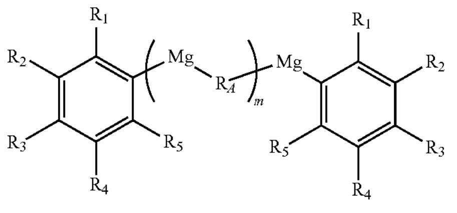

The organomagnesium compound of formula (IIa-m) is of formula (IIa-1) in the case where m is equal to 1.

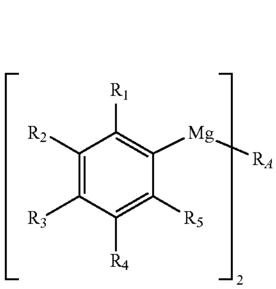

(IIa-1)

According to a preferential variant, $R_1$, $R_3$ and $R_5$ are identical in formula (IIa-m), notably in formula (IIa-1). According to a more preferential variant, $R_2$ and $R_4$ represent a hydrogen and $R_1$, $R_3$ and $R_5$ are identical. In a more preferential variant, $R_2$ and $R_4$ represent a hydrogen and $R_1$, $R_3$ and $R_5$ represent a methyl.

In formulae (IIa) and (IIa-m), in particular in formula (IIa-1) and in formula (IIb), $R^A$ is a divalent aliphatic hydrocarbon-based chain which may contain within its chain one or more heteroatoms chosen from oxygen and sulfur or one or more arylene groups. Preferably, $R^A$ is a branched or linear alkanediyl, cycloalkanediyl or xylenediyl radical. More preferentially, $R^A$ is an alkanediyl.

Preferably, $R^A$ contains 3 to 10 carbon atoms, in particular 3 to 8 carbon atoms.

Even more preferentially, $R^A$ is an alkanediyl containing 3 to 10 carbon atoms. Advantageously, $R^A$ is an alkanediyl containing 3 to 8 carbon atoms. Very advantageously, $R^A$ is a linear alkanediyl. 1,3-propanediyl, 1,4-butanediyl, 1,5-pentanediyl, 1,6-hexanediyl, 1,7-heptanediyl and 1,8-octanediyl are most particularly suitable as group $R^A$.

According to any one of the embodiments of the invention, m is preferentially equal to 1 in formula (IIa), in particular in formula (IIa-m).

The organomagnesium compound of formula (IIa) may be prepared via a process which comprises the reaction of a first organomagnesium reagent of formula X'Mg—$R^A$—MgX' with a second organomagnesium reagent of formula $R^B$—Mg—X', in which X' represents a halogen atom, preferentially bromine or chlorine, $R^B$ and $R^A$ being as defined previously. X' is more preferentially a bromine atom. The stoichiometry used in the reaction determines the value of m in formula (IIa) and in formula (IIa-m). For example, a mole ratio of 0.5 between the amount of the first organomagnesium reagent and the amount of the second organomagnesium reagent is favourable to the formation of an organomagnesium compound of formula (IIa) in which m is equal to 1, whereas a mole ratio of greater than 0.5 will be more favourable to the formation of an organomagnesium compound of formula (IV) in which m is greater than 1.

To perform the reaction of the first organomagnesium reagent with the second organomagnesium reagent, a solution of the second organomagnesium reagent is typically added to a solution of the first organomagnesium reagent. The solutions of the first organomagnesium reagent and the second organomagnesium reagent are generally solutions in an ether, such as diethyl ether, dibutyl ether, tetrahydrofuran, methyltetrahydrofuran, or a mixture of two or more of these ethers. Preferably, the respective concentrations of the solutions of the first organomagnesium reagent and the second organomagnesium reagent are from 0.01 to 3 mol/L and from 0.02 to 5 mol/L, respectively. More preferentially, the respective concentrations of the first organomagnesium reagent and the second organomagnesium reagent are from 0.1 to 2 mol/L and from 0.2 to 4 mol/L, respectively.

The first organomagnesium reagent and the second organomagnesium reagent may be prepared beforehand by a Grignard reaction from magnesium metal and a suitable precursor. For the first organomagnesium reagent and the second organomagnesium reagent, the respective precursors are of formulae X'—$R^A$—X' and $R^B$—X', $R^A$, $R^B$ and X' being as defined previously. The Grignard reaction is typically performed by adding the precursor to magnesium metal which is generally in the form of chips. Preferably, iodine ($I_2$) typically in the form of beads is introduced into the reactor prior to the addition of the precursor to activate the Grignard reaction in a known manner.

Alternatively, the organomagnesium compound of formula (IIa) may be prepared by reacting an organometallic compound of formula M-$R^A$-M and the organomagnesium reagent of formula $R^B$—Mg—X', where M represents a lithium, sodium or potassium atom, X', $R^B$ and $R^A$ being as defined previously. Preferably, M represents a lithium atom, in which case the organometallic compound of formula M-$R^A$-M is an organolithium reagent.

The reaction of the organolithium reagent and of the organomagnesium reagent is typically performed in an ether such as diethyl ether, dibutyl ether, tetrahydrofuran or methyltetrahydrofuran. The reaction is also typically performed at a temperature ranging from 0° C. to 60° C. The placing in contact is preferably performed at a temperature of between 0° C. and 23° C. The placing in contact of the organometallic compound of formula M-$R^A$-M with the organomagnesium reagent of formula $R^B$—Mg—X' is preferentially performed by adding a solution of the organometallic compound M-$R^A$-M to a solution of the organomagnesium reagent $R^B$—Mg—X'. The solution of the organometallic compound M-$R^A$-M is generally a solution in a hydrocarbon-based solvent, preferably n-hexane, cyclohexane or methylcyclohexane, and the solution of the organomagnesium reagent $R^B$—Mg—X' is generally a solution in an ether, preferably diethyl ether or dibutyl ether. Preferably, the respective concentrations of the solutions of the organometallic compound and of the organomagnesium reagent M-$R^A$-M and $R^B$—Mg—X' are from 0.01 to 1 mol/L and from 1 to 5 mol/L, respectively. More preferentially, the respective concentrations of the solutions of the organometallic compound and of the organomagnesium reagent M-$R^A$-M and $R^B$—Mg—X' are from 0.05 to 0.2 mol/L and from 2 to 3 mol/L, respectively.

As with any synthesis performed in the presence of organometallic compounds, the syntheses described for the synthesis of the organomagnesium reagents take place under anhydrous conditions under an inert atmosphere, in stirred reactors. Typically, the solvents and the solutions are used under anhydrous nitrogen or argon.

Once the organomagnesium reagent of formula (IIa) has been formed, it is generally recovered in solution after filtration performed under an inert anhydrous atmosphere. It may be stored prior to use in its solution in sealed containers, for example capped bottles, at a temperature of between −25° C. and 23° C.

Like any organomagnesium compound, the organomagnesium compound of formula (IIa) may be in the form of a monomeric species $(R^B—(Mg—R^A)_m—Mg—R^B)_1$ or in the form of a polymeric species $(R^B—(Mg—R^A)_m—Mg—R^B)_p$, where p is an integer greater than 1, notably dimer $(R^B—(Mg—R^A)_m—Mg—R^B)_2$, where m is as defined previously. Moreover, whether it is in the form of a monomer or polymer species, it may also be in the form of a species coordinated to one or more molecules of a solvent, preferably of an ether such as diethyl ether, tetrahydrofuran or methyltetrahydrofuran.

The compounds of formula (IIb) are well known as Grignard reagents. However, they are not known to be used as co-catalysts in a catalytic system for use in the preparation of polyolefins. Grignard reagents of formula (IIb) are described, for example, in the book "Advanced Organic Chemistry" by J. March, 4th Edition, 1992, pages 622-623 or in the book "Handbook of Grignard Reagents", Edition Gary S. Silverman, Philip E. Rakita, 1996, pages 502-503. They may be synthesized by placing magnesium metal in contact with a dihalogen compound of formula X—$R^C$—X, $R^C$ being as defined according to the invention. For their synthesis, reference may be made, for example, to the collection of volumes of "Organic Synthesis".

Like any organomagnesium compound, the organomagnesium reagent of formula (IIb) may be in the form of a monomer species $(X—Mg—R^A—Mg—X)_1$ or in the form of a polymer species $(X—Mg—R^A—Mg—X)_p$, p being an integer greater than 1, notably a dimer $(X—Mg—R^A—Mg—X)_2$. Moreover, whether it is in the form of a monomer or polymer species, it may also be in the form of a species coordinated to one or more molecules of a solvent, preferably of an ether such as diethyl ether, tetrahydrofuran or methyltetrahydrofuran. In formula (IIb), X is preferentially a bromine or chlorine atom, more preferentially a bromine atom.

The catalytic system may be prepared conventionally via a process analogous to that described in patent application WO 2007/054224 or WO 2007/054223. For example, the co-catalyst, in this case the organomagnesium reagent of formula (IIa) or of formula (IIb), and the metallocene are reacted in a hydrocarbon-based solvent typically at a temperature ranging from 20° C. to 80° C. for a time of between 5 and 60 minutes. The amounts of co-catalyst and of metallocene reacted are such that the ratio between the number of moles of Mg of the co-catalyst and the number of moles of rare-earth metal of the metallocene is preferably from 1 to 200 and more preferentially from 1 to less than 20. The range of values extending from 1 to less than 20 is notably more favourable for obtaining polymers of high molar masses. The catalytic system is generally prepared in an aliphatic hydrocarbon-based solvent such as methylcyclohexane, or an aromatic hydrocarbon-based solvent such as toluene. Generally, after its synthesis, the catalytic system is used as is in the process for the synthesis of the polymer in accordance with the invention.

Alternatively, the catalytic system may be prepared via a process analogous to that described in patent application WO 2017/093654 A1 or in patent application WO 2018/020122 A1. According to this alternative, the catalytic system also contains a preformation monomer chosen from a conjugated diene, ethylene or a mixture of ethylene and a conjugated diene, in which case the catalytic system is based at least on the metallocene, the co-catalyst and the preformation monomer. For example, the organomagnesium reagent and the metallocene are reacted in a hydrocarbon-based solvent typically at a temperature of from 20° C. to 80° C. for 10 to 20 minutes to obtain a first reaction product, and the preformation monomer, chosen from a conjugated diene, ethylene or a mixture of ethylene and a conjugated diene, is then reacted with this first reaction product at a temperature ranging from 40° C. to 90° C. for 1 hour to 12 hours. The conjugated diene, as preformation monomer, is preferably a 1,3-diene such as 1,3-butadiene, isoprene or a 1,3-diene of formula $CH_2{=}CR—CH{=}CH_2$, the symbol R representing a hydrocarbon chain containing 3 to 20 carbon atoms, in particular myrcene or β-farnesene. The catalytic system thus obtained may be used directly in the process for synthesizing the polymer in accordance with the invention or may be stored under an inert atmosphere, notably at a temperature ranging from −20° C. to room temperature (23° C.), before being used in the synthesis of polymers.

Like any synthesis performed in the presence of an organometallic compound, the synthesis of the metallocene, the synthesis of the organomagnesium reagent and the synthesis of the catalytic system take place under anhydrous conditions under an inert atmosphere. Typically, the reactions are performed starting with anhydrous solvents and compounds under anhydrous nitrogen or argon.

The catalytic system may be in the form of a solution when it is in the presence of a hydrocarbon-based solvent. The hydrocarbon-based solvent may be aliphatic, such as methylcyclohexane, or aromatic, such as toluene. The hydrocarbon-based solvent is preferably aliphatic, more preferentially methylcyclohexane. Generally, the catalytic system is stored in the form of a solution in the hydrocarbon-based solvent before being used in polymerization. This may then be referred to as a catalytic solution which comprises the catalytic system and the hydrocarbon-based solvent. The catalytic system preferably comprises a hydrocarbon-based solvent. When the catalytic system is in solution, its concentration is defined by the content of metallocene metal in the solution. The concentration of metallocene metal has a value preferentially ranging from 0.0001 to 0.2 mol/L, more preferentially from 0.001 to 0.03 mol/L.

The catalytic system is generally added to the reactor containing the polymerization solvent and the monomers. To achieve the desired macrostructure of the multiblock polymer, a person skilled in the art adapts the polymerization conditions, notably the mole ratio of the organomagnesium reagent to the metal Nd constituting the metallocene. The mole ratio may reach a value of 200, knowing that a mole ratio of less than 20 is more favourable for obtaining polymers with high molar masses.

A person skilled in the art also adapts the polymerization conditions and the concentrations of each of the reagents (constituents of the catalytic system, monomers) according to the equipment (tools, reactors) used to perform the polymerization. Preferably, the monomer mixture containing ethylene and a 1,3-diene contains more than 50 mol % of ethylene. As is known to those skilled in the art, the polymerization and the handling of the monomers, the catalytic system and the polymerization solvent(s) take place under anhydrous conditions and under an inert atmosphere. The polymerization solvents are typically aliphatic or aromatic hydrocarbon-based solvents.

The polymerization is preferably performed in solution, continuously or discontinuously, advantageously in a stirred reactor. The polymerization solvent may be an aromatic or aliphatic hydrocarbon-based solvent. Examples of polymerization solvents that may be mentioned include toluene and methylcyclohexane. Advantageously, the polymerization is performed in solution in a hydrocarbon-based solvent.

The preparation of the multiblock polymer, also known as a block polymer, involves the formation of a first block, known as the central block, of formula A-$R^A$-A, which is followed by the formation of the other blocks, known as the successive blocks. The constituent monomer units of the successive blocks are incorporated into the growing polymer chain from each of the chain ends of the central block. The formation of the central block requires a first monomer feed, in this case a monomer mixture containing ethylene and a 1,3-diene. The formation of the successive blocks is achieved by a polymerization reaction that propagates from the different ends of the preceding block. The formation of two blocks of the same microstructure from the different ends of the preceding block thus requires a single monomer feed. Thus, in the synthesis of a triblock polymer, two monomer feeds are used: a first monomer feed of a mixture containing ethylene and a 1,3-diene for the synthesis of the central block, a second monomer feed of ethylene for the synthesis of the terminal blocks, in this case polyethylene.

By polymerization of successive monomer feeds which are, respectively, a mixture containing ethylene and a 1,3-diene and ethylene, the process according to the invention leads to the preparation of multiblock polymers of formula $B-(A^1-B^1)_n-A-R^A-A-(B^1-A^1)_n-B$ in which A and $A^1$ each represent a block which is a statistical copolymer comprising 1,3-diene units and ethylene units, B and $B^1$ each represent a block which is a polyethylene, n is an integer greater than or equal to 0, $R^A$ is a divalent aliphatic hydrocarbon-based chain, interrupted or not with one or more oxygen or sulfur atoms or with one or more arylene groups. The presence in the polymer chain of the divalent radical comes from the co-catalyst used in the preparation of the multiblock polymer.

According to the invention, the central block is a “statistical copolymer”, which means that the constituent monomer units of the central block are statistically distributed in the central block, due to a statistical incorporation of the monomers into the growing polymer chain.

In the preparation of the central block, the polymerization temperature generally varies in the range from 30 to 160° C., preferentially from 30 to 120° C. During the preparation of the central block, the temperature of the reaction medium is advantageously kept constant during the copolymerization and the total reactor pressure is advantageously also kept constant. The preparation of the central block is completed by cutting off the monomer supply, notably by dropping the reactor pressure, preferably to about 3 bar.

The subsequent polymerization of ethylene is continued by applying ethylene pressure in the reactor, the ethylene pressure being kept constant until the desired consumption of ethylene to achieve the desired number-average molar mass of the polyethylene blocks. The ethylene polymerization temperature applied is preferably the same temperature as for the preparation of the central block. The polymerization temperature for the preparation of the polyethylene blocks generally varies in the range from 30 to 160° C., preferentially from 30 to 120° C. The pressure for the preparation of the polyethylene blocks generally varies in a range from 1 bar to 150 bar and preferentially from 1 bar to 10 bar. The synthesis of the polyethylene blocks is completed when the polyethylene blocks reach the desired number-average molar mass.

In the case of preparing a triblock polymer, the polymerization is stopped. In the case of preparing a multiblock polymer which comprises more than three blocks, such as a pentablock, the polymerization is continued by subsequent polymerizations of monomer feeds. For successive blocks containing both ethylene units and units of a 1,3-diene, the monomer feeds consist of a mixture containing ethylene and a 1,3-diene and the polymerization is performed under temperature and pressure conditions similar to those for the preparation of the central block. For the successive polyethylene blocks, the monomer feeds consist of ethylene and are polymerized under the pressure and temperature conditions already described for the synthesis of the polyethylene blocks. At the end of the multiblock polymer synthesis, the polymerization is stopped.

The polymerization may be stopped by cooling the polymerization medium or by adding an alcohol, preferentially an alcohol containing 1 to 3 carbon atoms, for example ethanol. The multiblock polymer, notably triblock polymer, may be recovered according to conventional techniques known to those skilled in the art, for instance by precipitation, by evaporation of the solvent under reduced pressure or by steam stripping.

In the process in accordance with the invention, the 1,3-diene of the mixture containing ethylene and a 1,3-diene may be a 1,3-diene containing 4 to 20 carbon atoms. The 1,3-diene is preferentially 1,3-butadiene, isoprene or a mixture of 1,3-dienes of which one is 1,3-butadiene. The 1,3-diene is more preferentially 1,3-butadiene according to any one of the embodiments of the invention.

According to a particularly preferential embodiment of the invention, the monomer mixture containing ethylene and a 1,3-diene is a mixture of ethylene and a 1,3-diene, which amounts to saying that ethylene and 1,3-diene are the only monomers of the monomer mixture. Advantageously, the monomer mixture containing ethylene and a 1,3-diene is a mixture of ethylene and a 1,3-diene and contains more than 50 mol % of ethylene.

According to another particularly preferential embodiment of the invention, the process leads to the synthesis of a triblock polymer of formula B-A-B in which A, referred to as the central block, is a statistical copolymer comprising 1,3-diene units and ethylene units, and B, referred to as the terminal block, is a polyethylene. Advantageously, the central block A is a statistical copolymer comprising 1,3-diene units and more than 50 mol % of ethylene units. Very advantageously, the central block A is a statistical copolymer of ethylene and 1,3-diene which contains more than 50 mol % of ethylene units. In the present patent application, the content of ethylene units in the central block, i.e. the number of moles of ethylene units in the central block, is expressed as a molar percentage relative to the number of moles of monomer units constituting the central block.

Preferably, the process leads to the synthesis of a block polymer which is an elastomer.

The polymer according to the invention, which is another subject of the invention, may be prepared via a particular embodiment of the process in accordance with the invention in which $R^A$ is other than an ethylene unit, a unit of a 1,3-diene, a chain of ethylene units, a chain of units of a 1,3-diene, a chain of units consisting of one or more ethylene units and one or more units of a 1,3-diene. The polymer in accordance with the invention is a multiblock polymer of formula (IV)

$$B-(A^1-B^1)_n-A-R^A-A-(B^1-A^1)_n-B \quad (IV)$$

in which A and $A^1$ each represent a block which is a statistical copolymer comprising units of a 1,3-diene and ethylene units, B and $B^1$ each represent a block which is polyethylene, n is an integer greater than or equal to 0, $R^A$ is an aliphatic hydrocarbon-based divalent chain, interrupted or not with one or more oxygen or sulfur atoms or one or more arylene groups, and $R^A$ is other than an ethylene unit, a 1,3-diene unit, a chain of ethylene units, a chain of 1,3-diene units, a chain of units consisting of one or more ethylene units and one or more 1,3-diene units.

Preferably, the polymer in accordance with the invention is an elastomer.

According to a particularly preferential embodiment of the invention, the multiblock polymer is a polymer of formula (IV) in which n is equal to 0, in which case the polymer is a triblock, preferably an elastomer.

According to another embodiment of the invention which may be combined with the other embodiments relating to the polymer in accordance with the invention, the multiblock polymer contains 1,2-cyclohexanediyl units.

In summary, the invention is advantageously performed according to any one of the following embodiments 1 to 40:

Embodiment 1: Process for preparing a multiblock polymer, which comprises the statistical copolymerization of a monomer mixture containing ethylene and a 1,3-diene followed by the subsequent polymerization of ethylene in the presence of a catalytic system based on at least one metallocene of formula (Ia) or (Ib) and an organomagnesium reagent of formula (IIa) or (IIb)

$$\{P(Cp^1)(Cp^2)Y\} \quad \text{(Ia)}$$

$$Cp^3Cp^4Y \quad \text{(Ib)}$$

Y denoting a group including a rare-earth metal atom, $Cp^1$ and $Cp^2$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, $Cp^3$ and $Cp^4$, which are identical or different, are chosen from the group consisting of fluorenyl groups, cyclopentadienyl groups and indenyl groups, the groups being substituted or unsubstituted, $$R^B\text{—}(Mg\text{—}R^A)_m\text{—}Mg\text{—}R^B \quad \text{(IIa)}$$

$$X\text{—}Mg\text{—}R^A\text{—}Mg\text{—}X \quad \text{(IIb)}$$

$R^A$ being a divalent aliphatic hydrocarbon-based chain, interrupted or not with one or more oxygen or sulfur atoms or with one or more arylene groups, $R^B$ comprising a benzene nucleus substituted with the magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, X being a halogen atom, m being a number greater than or equal to 1 and preferably equal to 1.

Embodiment 2: Process according to embodiment 1, in which the symbol Y represents the group Met-G, with Met denoting the rare-earth metal atom and G denoting a halogen atom chosen from the group consisting of chlorine, fluorine, bromine and iodine or a group comprising the borohydride unit $BH_4$.

Embodiment 3: Process according to embodiment 2, in which G denotes a chlorine atom or the group of formula (III)

$$(BH_4)_{(1+y)}\text{-}L_y\text{-}N_x \quad \text{(III)}$$

in which

L represents an alkali metal chosen from the group consisting of lithium, sodium and potassium, N represents a molecule of an ether, preferably diethyl ether or tetrahydrofuran, x, which may or may not be an integer, is greater than or equal to 0, y, which is an integer, is greater than or equal to 0.

Embodiment 4: Process according to embodiment 3, in which G denotes the group of formula (III).

Embodiment 5: Process according to any one of embodiments 1 to 4, in which the rare-earth metal is a lanthanide, the atomic number of which ranges from 57 to 71.

Embodiment 6: Process according to any one of embodiments 1 to 5, in which the rare-earth metal is neodymium.

Embodiment 7: Process according to any one of embodiments 1 to 6, in which the metallocene is of formula (Ia).

Embodiment 8: Process according to any one of embodiments 1 to 7, in which $Cp^1$ and $Cp^2$ are identical and are chosen from the group consisting of substituted fluorenyl groups and the unsubstituted fluorenyl group of formula $C_{13}H_8$.

Embodiment 9: Process according to any one of embodiments 1 to 8, in which $Cp^1$ and $Cp^2$ are identical and are the fluorenyl group of formula $C_{13}H_8$.

Embodiment 10: Process according to any one of embodiments 1 to 9, in which the bridge P corresponds to the formula $ZR^1R^2$, Z representing a silicon or carbon atom, $R^1$ and $R^2$, which may be identical or different, each representing an alkyl group comprising from 1 to 20 carbon atoms.

Embodiment 11: Process according to embodiment 10, in which $R^1$ and $R^2$, which may be identical or different, each represent a methyl.

Embodiment 12: Process according to embodiment 10 or 11, in which Z represents a silicon atom.

Embodiment 13: Process according to any one of embodiments 1 to 12, in which the metallocene is of formula (III-1), (III-2), (III-3), (III-4) or (III-5):

$$[Me_2Si(Flu)_2Nd(\mu\text{-}BH_4)_2Li(THF)] \quad \text{(III-1)}$$

$$[\{Me_2SiFlu_2Nd(\mu\text{-}BH_4)_2Li(THF)\}_2] \quad \text{(III-2)}$$

$$[Me_2SiFlu_2Nd(\mu\text{-}BH_4)(THF)] \quad \text{(III-3)}$$

$$[\{Me_2SiFlu_2Nd(\mu\text{-}BH_4)(THF)\}_2] \quad \text{(III-4)}$$

$$[Me_2SiFlu_2Nd(\mu\text{-}BH_4)] \quad \text{(III-5)}$$

Flu representing the $C_{13}H_8$ group.

Embodiment 14: Process according to any one of embodiments 1 to 13, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

Embodiment 15: Process according to any one of embodiments 1 to 14, in which the carbon atoms of the benzene nucleus of $R^B$ ortho to the magnesium are substituted with a methyl or an ethyl.

Embodiment 16: Process according to any one of embodiments 1 to 15, in which the carbon atoms of the benzene nucleus of $R^B$ ortho to the magnesium are substituted with a methyl.

Embodiment 17: Process according to any one of embodiments 1 to 16, in which the organomagnesium reagent of formula (IIa) is of formula (IIa-m), (IIa-m)

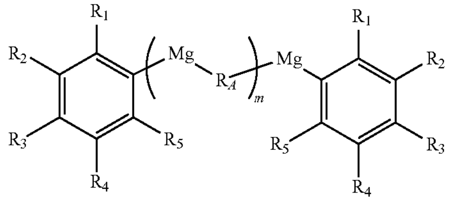

$R_1$ and $R_5$, which are identical or different, represent a methyl or an ethyl, preferably a methyl, $R_2$, $R_3$ and $R_4$, which are identical or different, being a hydrogen atom or an alkyl, $R^A$ being a divalent aliphatic hydrocarbon-based chain, interrupted or not with one or more oxygen or sulfur atoms or with one or more arylene groups, m being a number greater than or equal to 1 and preferably equal to 1.

Embodiment 18: Process according to any one of embodiments 1 to 17, in which m is equal to 1.

Embodiment 19: Process according to embodiment 17 or 18, in which $R_1$ and $R_5$ represent a methyl.

Embodiment 20: Process according to any one of embodiments 17 to 19, in which $R_2$ and $R_4$ represent a hydrogen atom.

Embodiment 21: Process according to any one of embodiments 1 to 20, in which $R^A$ is a branched or linear alkanediyl, cycloalkanediyl or xylenediyl radical.

Embodiment 22: Process according to any one of embodiments 1 to 21, in which $R^A$ is an alkanediyl.

Embodiment 23: Process according to any one of embodiments 1 to 22, in which $R^A$ contains 3 to 10 carbon atoms.

Embodiment 24: Process according to any one of embodiments 1 to 23, in which $R^A$ contains 3 to 8 carbon atoms.

Embodiment 25: Process according to any one of embodiments 1 to 24, in which X is a bromine or chlorine atom.

Embodiment 26: Process according to any one of embodiments 1 to 25, in which X is a bromine atom.

Embodiment 27: Process according to any one of embodiments 1 to 26, in which the monomer mixture containing ethylene and a 1,3-diene contains more than 50 mol % of ethylene.

Embodiment 28: Process according to any one of embodiments 1 to 27, in which the monomer mixture containing ethylene and 1,3-diene is a mixture of ethylene and a 1,3-diene.

Embodiment 29: Process according to any one of embodiments 1 to 28, in which the 1,3-diene is 1,3-butadiene, isoprene or a mixture of 1,3-dienes one of which is 1,3-butadiene.

Embodiment 30: Process according to any one of embodiments 1 to 29, in which the 1,3-diene is 1,3-butadiene.

Embodiment 31: Process according to any one of embodiments 1 to 30, in which the multiblock polymer contains 1,2-cyclohexanediyl units.

Embodiment 32: Process according to any one of embodiments 1 to 31, in which the multiblock polymer is a triblock polymer of formula B-A-B in which A, referred to as the central block, is a statistical copolymer comprising 1,3-diene units and ethylene units, and B, referred to as the terminal block, is a polyethylene.

Embodiment 33: Process according to any one of embodiments 1 to 32, in which the multiblock polymer is an elastomer.

Embodiment 34: Multiblock polymer of formula (IV)

$$B\text{-}(A^1\text{-}B^1)_n\text{-}A\text{-}R^A\text{-}A\text{-}(B^1\text{-}A^1)_n\text{-}B \qquad \text{(IV)}$$

in which A and $A^1$ each represent a block which is a statistical copolymer comprising units of a 1,3-diene and ethylene units, B and $B^1$ each represent a block which is polyethylene, n is an integer greater than or equal to 0, $R^A$ is an aliphatic hydrocarbon-based divalent chain, interrupted or not with one or more oxygen or sulfur atoms or one or more arylene groups, and $R^A$ is other than an ethylene unit, a 1,3-diene unit, a chain of ethylene units, a chain of 1,3-diene units, a chain of units consisting of one or more ethylene units and one or more 1,3-diene units.

Embodiment 35: Polymer according to embodiment 34, which polymer is an elastomer.

Embodiment 36: Polymer according to embodiment 34 or 35, which polymer is a triblock of formula (IV) in which n is equal to 0.

Embodiment 37: Polymer according to any one of embodiments 34 to 36, in which the 1,3-diene is 1,3-butadiene, isoprene or a mixture of 1,3-dienes, one of which is 1,3-butadiene.

Embodiment 38: Polymer according to any one of embodiments 34 to 37, which polymer contains 1,2-cyclohexanediyl units.

Embodiment 39: Process according to any one of embodiments 1 to 33, in which the ratio between the number of moles of Mg of the co-catalyst and the number of moles of rare-earth metal of the metallocene ranges from 1 to 200.

Embodiment 40: Process according to any one of embodiments 1 to 33, in which the ratio between the number of moles of Mg of the co-catalyst and the number of moles of rare-earth metal of the metallocene ranges from 1 to less than 20.

The abovementioned features of the present invention, and also others, will be understood more clearly on reading the following description of several implementation examples of the invention, which are given as nonlimiting illustrations.

Example

High temperature size exclusion chromatography (HT-SEC). The high temperature size exclusion chromatography (SEC-HT) analyses were performed with a Viscotek machine (Malvern Instruments) equipped with three columns (PLgel Olexis 300 mm×7 mm I. D. from Agilent Technologies) and three detectors (differential refractometer and viscometer, and light scattering). 200 µL of a solution of the sample at a concentration of 3 mg $mL^{-1}$ were eluted in 1,2,4-trichlorobenzene using a flow rate of 1 mL $min^{-1}$ at 150° C. The mobile phase was stabilized with 2,6-di(tert-butyl)-4-methylphenol (400 mg $L^{-1}$). OmniSEC software was used for data acquisition and analysis. The number-average molar masses (Mn) of the synthesized ethylene-butadiene copolymers were calculated using a universal calibration curve calibrated from standard polystyrenes (peak molar mass $M_p$: 672 to 12 000 000 g $mol^{-1}$) from Polymer Standard Service (Mainz) using refractometric and viscometric detectors.

Nuclear magnetic resonance (NMR). High resolution $^1H$ NMR spectroscopy of the copolymers was performed on a Bruker 400 Avance III spectrometer operating at 400 MHz equipped with a 5 mm BBFO probe. The acquisitions were made at 363 K. A mixture of tetrachloroethylene (TCE) and deuterated benzene ($C_6D_6$) (2/1 v/v) was used as solvent. The samples were analysed at a concentration of 17 g $L^{-1}$.

The chemical shifts are given in ppm, relative to the deuterated benzene proton signal set at 7.16 ppm. The number of acquisitions is set at 512.

Differential scanning calorimetry (DSC) The analyses are performed on a DSC $3^+$ machine (Mettler Toledo) using a dynamic method including nine temperature stages: Stage 1: 20 to 180° C. (10° C. $min^{-1}$), Stage 2: isothermal 180° C. (5 min), Stage 3: 180 to −80° C. (−10° C. $min^{-1}$), Stage 4: isothermal −80° C. (5 min), Stage 5: −80 to 180° C. (10° C. $min^{-1}$), Stage 6: isothermal 180° C. (5 min), Stage 7: 180 to −80° C. (10° C. $min^{-1}$), Stage 8: isothermal −80° C. (5 min), Stage 9: −80 to 180° C. (10° C. $min^{-1}$). The first two rises allow the thermal history of the sample to be erased. The glass transition temperature and melting point are measured on the ninth stage. The seventh stage is also retained to obtain information regarding the crystallization of the sample.

The degree of crystallinity is determined relative to a 100% crystalline polyethylene ($\Delta_f H$=293 J $g^{-1}$; B. Wunderlich, Thermal Analysis, Academic Press, 1990, 281).

Preparation of the Co-Catalyst, 1,5-Di(Magnesium Bromide)Pentanediyl (DBMP)

1.25 g (50 mmol, 10 equivalents) of magnesium are inertized in a 50 mL flask fitted with a magnetized olive and mounted with a 10 mL dropping funnel. A diiodine bead (10 mg) is added to the magnesium. 11 mL of MeTHF distilled over sodium/benzophenone are placed in the flask with stirring and 9 mL are placed in the dropping funnel. 0.68 mL of 1,5-dibromopentane (5 mmol, 1 equivalent) degassed and dried over activated molecular sieves is placed in the dropping funnel. The haloalkane solution is poured dropwise onto the magnesium over 1 h. Stirring is continued for 12 h at 20° C. This solution is concentrated under vacuum and then diluted in 10 mL of toluene. The concentration of pentanediyl group is estimated at 0.45 mol $L^{-1}$.

$^1$H NMR ($C_6D_6$—400 MHz—298 K) δ: ppm=2.06 (quint, J=7.6 Hz, “b”), 1.80 (quint, J=7.4 Hz, “c”), −0.05 (t, J=7.7 Hz, “a”); quint for quintet.

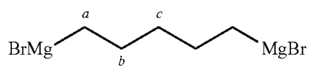

Preparation of a Triblock Polymer in Accordance with the Invention, with a Statistical Copolymer Central Block of Ethylene and 1,3-Butadiene and Polyethylene End Blocks:

200 mL of toluene (Biosolve) purified on an SPS800 MBraun system are placed in an inertized 250 mL flask equipped with a magnetized olive. 0.6 mL (0.25 mmol) of a solution of prepared 1,5-di(magnesium bromide)pentanediyl (DBMP 0.45 mol $L^{-1}$) is added to the flask with stirring. 16 mg (25 µmol of neodymium) of $\{(Me_2Si(C_{13}H_8)_2)Nd(—BH_4)[(—BH_4)Li(THF)]\}_2$ are then added to the flask.

Preparation of the central block (Step 1): The catalytic solution is then transferred through a cannula into a 250 mL reactor under an inert atmosphere at 70° C. The argon excess pressure in the reactor is reduced to 0.5 bar and the reactor is then pressurized to 4 bar with an ethylene/butadiene mixture with a mole ratio of 80/20 with stirring at 1000 rpm. The pressure is kept constant in the reactor by means of a tank containing the ethylene/butadiene mixture. After a pressure drop in the tank equivalent to about 13 g of monomers, the feed is stopped and the reactor is isolated until the pressure in the reactor reaches 2.8 bar to yield 15 g of copolymer.

Preparation of the terminal blocks (Step 2): The reactor is again pressurized to 4 bar using a tank containing ethylene only, then about 3 g of monomers are consumed by pressure drop in the tank.

The reactor is degassed and the temperature is reduced to 20° C. The polymer solution is precipitated from methanol with stirring in the presence of about 20 mg of 2,2'-methylenebis(6-tert-butyl-4-methylphenol) as antioxidant. The polymer obtained is dried under vacuum at 70° C. for 4 h. 18.5 g of dry triblock polymer are recovered. The characteristics of the triblock polymer are as follows:

Glass transition temperature Tg: −35° C. corresponding to the statistical copolymer block of ethylene and 1,3-butadiene;

Melting point Tm: 122° C. corresponding to the polyethylene blocks;

Degree of crystallinity: 8.9% by mass;

Mn HT-SEC: 62 600 g/mol.

The content of ethylene unit, the content of 1,3-butadiene unit in the 1,2-configuration (1,2-unit), in the 1,4-configuration (1,4-unit) and the content of 1,2-cyclohexanediyl unit, expressed as molar percentages relative to the total monomer units of the polymer, are, respectively, 81.9%, 6.7%, 4.0% and 7.4%.

The invention claimed is:

1. A process for preparing a multiblock polymer, which comprises the statistical copolymerization of a monomer mixture containing ethylene and a 1,3-diene, followed by the subsequent polymerization of ethylene in the presence of a catalytic system based on at least one metallocene of formula (Ia) or (Ib) and an organomagnesium reagent of formula (IIa) or (IIb)

$$\{P(Cp^1)(Cp^2)Y\} \quad (Ia)$$

$$Cp^3Cp^4Y \quad (Ib)$$

Y denoting a group including a rare-earth metal atom, $Cp^1$ and $Cp^2$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, $Cp^3$ and $Cp^4$, which are identical or different, are chosen from the group consisting of fluorenyl groups, cyclopentadienyl groups and indenyl groups, the groups being substituted or unsubstituted, $$R^B—(Mg—R^A)_m—Mg—R^B \quad (IIa)$$

$$X—Mg—R^A—Mg—X \quad (IIb)$$

$R^A$ being a divalent aliphatic hydrocarbon-based chain, interrupted or not with one or more oxygen or sulfur atoms or with one or more arylene groups, $R^B$ comprising a benzene nucleus substituted with the magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, X being a halogen atom, m being a number greater than or equal to 1.

2. The process according to claim 1, in which the symbol Y represents the group Met-G, with Met denoting the rare-earth metal atom and G denotes a halogen atom chosen from the group consisting of chlorine, fluorine, bromine and iodine or a group comprising the borohydride unit $BH_4$.

3. The process according to claim 1, in which the rare-earth metal is a lanthanide, the atomic number of which ranges from 57 to 71.

4. The process according to claim 1, in which the bridge P corresponds to the formula $ZR^1R^2$, Z representing a silicon or carbon atom and $R^1$ and $R^2$, which may be identical or different, each representing an alkyl group comprising from 1 to 20 carbon atoms.

5. The process according to claim 1, in which the metallocene is of formula (III-1), (III-2), (III-3), (III-4) or (III-5):

$[Me_2Si(Flu)_2Nd(\mu\text{-}BH_4)_2Li(THF)]$ (III-1)

$[\{Me_2SiFlu_2Nd(\mu\text{-}BH_4)_2Li(THF)\}_2]$ (III-2)

$[Me_2SiFlu_2Nd(\mu\text{-}BH_4)(THF)]$ (III-3)

$[\{Me_2SiFlu_2Nd(\mu\text{-}BH_4)(THF)\}_2]$ (III-4)

$[Me_2SiFlu_2Nd(\mu\text{-}BH_4)]$ (III-5)

Flu representing the $C_{13}H_8$ group.

6. The process according to claim 1, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

7. The process according to claim 1, in which the carbon atoms of the benzene nucleus of $R^B$ ortho to the magnesium are substituted with a methyl or an ethyl.

8. The process according to claim 1, in which the organomagnesium reagent of formula (IIa) is of formula (IIa-m), (IIa-m)

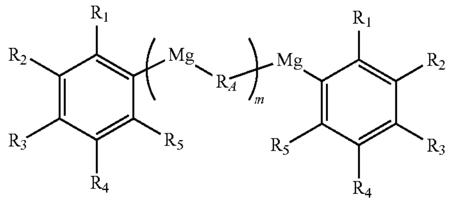

$R_1$ and $R_5$, which are identical or different, represent a methyl or an ethyl, $R_2$, $R_3$ and $R_4$, which are identical or different, being a hydrogen atom or an alkyl, $R_A$ being a divalent aliphatic hydrocarbon-based chain, interrupted or not with one or more oxygen or sulfur atoms or with one or more arylene groups, m being a number greater than or equal to 1.

9. The process according to claim 1, in which $R_A$ is a branched or linear alkanediyl, cycloalkanediyl or xylenediyl radical.

10. The process according to claim 1, in which $R_A$ contains 3 to 10 carbon atoms.

11. The process according to claim 1, in which X is a bromine or chlorine atom.

12. The process according to claim 1, in which the 1,3-diene is 1,3-butadiene, isoprene or a mixture of 1,3-dienes one of which is 1,3-butadiene.

13. The process according to claim 1, in which the monomer mixture containing ethylene and a 1,3-diene is a mixture of ethylene and a 1,3-diene which advantageously contains more than 50 mol % of ethylene.

14. The process according to claim 1, in which the block polymer is a triblock polymer of formula B-A-B in which A, referred to as the central block, is a statistical copolymer comprising 1,3-diene units and ethylene units, and B, referred to as the terminal block, is a polyethylene.

15. A multiblock polymer of formula (IV)

$$B\text{-}(A^1\text{-}B^1)_n\text{-}A\text{-}R^A\text{-}A\text{-}(B^1\text{-}A^1)_n\text{-}B \quad \text{(IV)}$$

in which A and $A^1$ each represent a block which is a statistical copolymer comprising units of a 1,3-diene and ethylene units, B and $B^1$ each represent a block which is polyethylene, n is an integer greater than or equal to 0, $R^A$ is an aliphatic hydrocarbon-based divalent chain, interrupted or not with one or more oxygen or sulfur atoms or one or more arylene groups, and $R^A$ is other than an ethylene unit, a 1,3-diene unit, a chain of ethylene units, a chain of 1,3-diene units, a chain of units consisting of one or more ethylene units and one or more 1,3-diene units.

16. The process according to claim 1, in which m is equal to 1.

17. The process according to claim 2, in which G denotes a chlorine atom or the group of formula (III)

$$(BH_4)_{(1+y)}\text{-}L_y\text{-}N_x \quad \text{(III)}$$

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

18. The process according to claim 3, in which the rare-earth metal is neodymium.

19. The process according to claim 4, in which $R^1$ and $R^2$ each represent a methyl.

20. The process according to claim 7, in which the carbon atoms of the benzene nucleus of $R^B$ ortho to the magnesium are substituted with a methyl.

* * * * *